(12) United States Patent
Courtney

(10) Patent No.: US 7,065,562 B2
(45) Date of Patent: Jun. 20, 2006

(54) SYSTEM AND METHOD FOR GENERATING A REPRESENTATION OF A CONFIGURATION SCHEMA

(75) Inventor: Mike Courtney, Colorado Springs, CO (US)

(73) Assignee: Intelliden, Inc., Colorado Springs, CO (US)

( * ) Notice: Subject to any disclaimer, the term of this patent is extended or adjusted under 35 U.S.C. 154(b) by 578 days.

(21) Appl. No.: 09/991,764

(22) Filed: Nov. 26, 2001

(65) Prior Publication Data

US 2003/0101240 A1 May 29, 2003

(51) Int. Cl.
G06F 15/177 (2006.01)

(52) U.S. Cl. ............... 709/220; 709/223; 707/1; 707/3; 707/100; 345/705

(58) Field of Classification Search ........ 709/223–224; 707/1, 100, 3; 345/705
See application file for complete search history.

(56) References Cited

U.S. PATENT DOCUMENTS

| | | |
|---|---|---|
| 4,991,089 A | 2/1991 | Shorter |
| 5,109,486 A | 4/1992 | Seymour |
| 5,159,685 A | 10/1992 | Kung |
| 5,442,791 A | 8/1995 | Wrabetz et al. |
| 5,475,819 A | 12/1995 | Miller et al. |
| 5,491,820 A | 2/1996 | Belove et al. |
| 5,519,704 A | 5/1996 | Farinacci et al. |
| 5,557,748 A | 9/1996 | Noris |
| 5,581,764 A | 12/1996 | Fitzgerald et al. |
| 5,724,509 A | 3/1998 | Starkweather et al. |
| 5,726,883 A | 3/1998 | Levine et al. |
| 5,751,967 A | 5/1998 | Raab et al. |
| 5,764,955 A | 6/1998 | Doolan |
| 5,784,702 A | 7/1998 | Greenstein et al. |
| 5,787,246 A | 7/1998 | Lichtman et al. |
| 5,796,732 A | 8/1998 | Mazzola et al. |
| 5,819,028 A | 10/1998 | Manghirmalani et al. |
| 5,832,503 A | 11/1998 | Malik et al. |
| 5,838,918 A | 11/1998 | Prager et al. |
| 5,842,040 A | 11/1998 | Hughes et al. |
| 5,852,740 A | 12/1998 | Estes |
| 5,872,928 A | 2/1999 | Lewis et al. |
| 5,884,028 A | 3/1999 | Kindell et al. |
| 5,889,953 A | 3/1999 | Thebaut et al. |
| 5,920,701 A | 7/1999 | Miller et al. |
| 5,944,782 A | 8/1999 | Noble et al. |
| 5,948,065 A | 9/1999 | Eilert et al. |
| 5,956,341 A | 9/1999 | Galand et al. |
| 5,961,594 A | 10/1999 | Bouvier et al. |
| 5,968,122 A | 10/1999 | Schlosser et al. |
| 5,968,176 A | 10/1999 | Nessett et al. |
| 5,974,236 A | 10/1999 | Sherman |

(Continued)

FOREIGN PATENT DOCUMENTS

EP 0 384 339 A2 8/1990

(Continued)

OTHER PUBLICATIONS

Strassner, John; Technology Series—*Directory Enabled Networks*, 1999; MacMillan Technical Publishing USA.

(Continued)

*Primary Examiner*—Wen-Tai Lin
(74) *Attorney, Agent, or Firm*—Cooley Godward LLP

(57) ABSTRACT

A system and method for managing and modeling a network device using a representation of a configuration schema is disclosed. One implementation includes a configuration hash key storage module; a configuration hash object storage module; and a configuration manager.

12 Claims, 10 Drawing Sheets

U.S. PATENT DOCUMENTS

| | | | |
|---|---|---|---|
| 5,980,078 | A | 11/1999 | Krivoshein et al. |
| 6,006,035 | A | 12/1999 | Nabahi |
| 6,016,306 | A | 1/2000 | Le Boudec et al. |
| 6,023,586 | A | 2/2000 | Gaisford et al. |
| 6,028,846 | A | 2/2000 | Cain |
| 6,041,347 | A | 3/2000 | Harsham et al. |
| 6,049,828 | A | 4/2000 | Dev et al. |
| 6,055,568 | A | 4/2000 | Adams |
| 6,097,697 | A | 8/2000 | Yao et al. |
| 6,098,094 | A | 8/2000 | Barnhouse et al. |
| 6,098,101 | A | 8/2000 | Sears |
| 6,098,108 | A | 8/2000 | Sridhar et al. |
| 6,101,508 | A | 8/2000 | Wolff |
| 6,104,700 | A | 8/2000 | Haddock et al. |
| 6,105,069 | A | 8/2000 | Franklin et al. |
| 6,108,699 | A | 8/2000 | Moiin |
| 6,108,703 | A | 8/2000 | Leighton et al. |
| 6,122,664 | A | 9/2000 | Boukobza et al. |
| 6,128,729 | A | 10/2000 | Kimball et al. |
| 6,131,118 | A | 10/2000 | Stupek, Jr. et al. |
| 6,131,119 | A | 10/2000 | Fukui |
| 6,154,776 | A | 11/2000 | Martin |
| 6,167,445 | A | 12/2000 | Gai et al. |
| 6,170,009 | B1 | 1/2001 | Mandal et al. |
| 6,170,011 | B1 | 1/2001 | Macleod Beck et al. |
| 6,182,094 | B1 | 1/2001 | Humpleman et al. |
| 6,198,479 | B1 | 3/2001 | Humpleman et al. |
| 6,202,090 | B1 | 3/2001 | Simone |
| 6,243,747 | B1 | 6/2001 | Lewis et al. |
| 6,260,072 | B1 | 7/2001 | Rodriguez-Moral |
| 6,269,398 | B1 | 7/2001 | Leong et al. |
| 6,292,889 | B1 | 9/2001 | Fitzgerald et al. |
| 6,349,306 | B1 | 2/2002 | Malik et al. |
| 6,356,955 | B1 | 3/2002 | Hollberg et al. |
| 6,363,411 | B1 | 3/2002 | Dugan et al. |
| 6,370,119 | B1 | 4/2002 | Basso et al. |
| 6,381,631 | B1 | 4/2002 | Van Hoff |
| 6,393,425 | B1 | 5/2002 | Kelly |
| 6,418,468 | B1 | 7/2002 | Ahlstrom et al. |
| 6,438,594 | B1 | 8/2002 | Bowman-Amuah |
| 6,442,608 | B1 | 8/2002 | Knight et al. |
| 6,449,638 | B1 | 9/2002 | Wecker et al. |
| 6,463,583 | B1 | 10/2002 | Hammond |
| 6,496,843 | B1* | 12/2002 | Getchius et al. ............ 715/526 |
| 6,539,425 | B1 | 3/2003 | Stevens et al. |
| 6,550,060 | B1 | 4/2003 | Hammond |
| 6,567,406 | B1 | 5/2003 | Skemer |
| 6,609,108 | B1 | 8/2003 | Pulliam et al. |
| 6,615,166 | B1 | 9/2003 | Guheen et al. |
| 6,625,590 | B1 | 9/2003 | Chen et al. |
| 6,636,877 | B1* | 10/2003 | Doleac et al. .............. 707/203 |
| 6,643,640 | B1* | 11/2003 | Getchius et al. ............... 707/3 |
| 6,654,799 | B1 | 11/2003 | Tanaka |
| 6,658,526 | B1 | 12/2003 | Nguyen et al. |
| 6,678,827 | B1 | 1/2004 | Rothermel et al. |
| 6,684,241 | B1* | 1/2004 | Sandick et al. ............ 709/220 |
| 6,684,244 | B1 | 1/2004 | Goldman et al. |
| 6,697,967 | B1* | 2/2004 | Robertson .................... 714/43 |
| 6,725,233 | B1 | 4/2004 | Froyd et al. |
| 6,769,116 | B1 | 7/2004 | Sexton |
| 6,775,698 | B1 | 8/2004 | Simone |
| 6,826,597 | B1 | 11/2004 | Lonnroth et al. |
| 2002/0032769 | A1 | 3/2002 | Barkai et al. |
| 2002/0038320 | A1 | 3/2002 | Brook |
| 2002/0051080 | A1 | 5/2002 | Tanaka |
| 2002/0171762 | A1 | 11/2002 | Maxson et al. |
| 2002/0174091 | A1 | 11/2002 | Froyd et al. |
| 2002/0191619 | A1 | 12/2002 | Shafer |
| 2002/0198974 | A1 | 12/2002 | Shafer |
| 2003/0033589 | A1 | 2/2003 | Reyna et al. |
| 2003/0037040 | A1* | 2/2003 | Beadles et al. ................ 707/1 |
| 2003/0048287 | A1* | 3/2003 | Little et al. ................. 345/705 |
| 2003/0084135 | A1* | 5/2003 | Narain ....................... 709/223 |
| 2003/0135508 | A1* | 7/2003 | Chorafakis et al. ......... 707/100 |
| 2004/0078695 | A1 | 4/2004 | Bowers et al. |
| 2004/0225865 | A1* | 11/2004 | Cox et al. ..................... 712/34 |

FOREIGN PATENT DOCUMENTS

| | | |
|---|---|---|
| EP | 0 810 755 A2 | 12/1997 |
| EP | 0 762 281 A3 | 3/1999 |
| EP | 0 973 296 A2 | 1/2000 |
| EP | 0 993 725 A1 | 4/2000 |
| EP | 1 011 230 A2 | 6/2000 |
| EP | 1 012 726 A1 | 6/2000 |
| EP | 1 026 867 A2 | 8/2000 |
| EP | 1 047 226 A2 | 10/2000 |
| EP | 1 090 492 A1 | 4/2001 |
| EP | 1 091 526 A2 | 4/2001 |
| GB | 2 368 692 A | 5/2002 |
| WO | WO 95/08794 | 3/1995 |
| WO | WO 95/24802 A | 9/1995 |
| WO | WO 98/18235 A | 4/1998 |
| WO | WO 98/24208 | 6/1998 |
| WO | WO 99/01968 | 1/1999 |
| WO | WO 99/11003 | 3/1999 |
| WO | WO 99/67931 | 12/1999 |
| WO | WO 00/04665 | 1/2000 |
| WO | WO 00/41091 | 7/2000 |
| WO | WO 01/01293 A2 | 1/2001 |
| WO | WO 01/19031 A1 | 3/2001 |
| WO | WO 01/47185 A2 | 6/2001 |
| WO | WO 01/47186 A2 | 6/2001 |
| WO | WO 02/47332 A2 | 6/2002 |

OTHER PUBLICATIONS

"FFST/2 Generic Alert Router for LAN and SNA Transports," IBM Technical Disclosure Bulletin, IBM Corp. New York, US, vol. 34, No. 11, Apr. 1, 1992, pp. 467-468, XP000303331, ISSN: 0018-8689.

Torrente S et al: "Implementation of the ANSI T1M1.5 GBM-T1.214 within an ODBMS framework" Networking: Foundation for the Future, San Francisco, Mar. 28-Apr. 1, 1993, Proceedings of the Annual Joint Conference of the Computer and Communications Societies (INFOCOM), Los Alamitos, IEE Comp. Soc. Press, US, vol. 2 CONF. 12, Mar. 28, 1993, pp. 875-884, XP010032227, ISBN: 0-8186-3580-0.

Kennedy T W: "Network Operations & Management Tool Requirements for the 90s" Proceedings of the Network Operations and Management Symposium (NOMS). Memphis, Apr. 6-9, 1992, New York, IEEE, U.S. Vo. 1, 1992, pp. 122-132.

Lee, W.C. et al: "Routing Subject to Quality of Service Constraints in Integrated Communication Networks" IEEE Network, IEEE Inc. New York, US, vol. 9, No. 4, Jul. 1, 1995, pp. 46-55, XP000526591, ISSN: 0890-8044 the whole document.

Williams R: "Web Based Enterprise Management W101" DMTF 1999 Annual Conference, Online! Jun. 15-16, 1999, pp. 1-21.

Wolfson, Ouri et al.: "Managing Communication Networks by Monitoring Databases", IEEE Transactions on Software Engineering, IEEE Inc. New York, US, vol. 17, No. 9 Sep. 1, 1991, pp. 944-953.

PCT/US 01/45668—International Search Report dated Oct. 16, 2002.

PCT/US 01/45669—International Search Report dated Oct. 16, 2002.

PCT/US 01/45671—International Search Report dated Oct. 16, 2002.

PCT/US 01/45670—International Search Report dated Dec. 20, 2002.

PCT/US 01/45672—International Search Report dated Apr. 14, 2003.

PCT/US 01/45671—Written Opinion dated Dec. 13, 2002.

Managing Managed Network Services: The Service Provider Blind Spot; Infonetics Research, The Networking Information Source; Jun. 2000 (18 pages).

ISM Customer—Aware™ *Query*; CoManage Corporation; As of Dec. 5, 2000 (2 pages).

ISM Customer—Aware™ *Provisioning*; CoManage Corporation; As of Dec. 5, 2000 (2 pages).

ISM Customer—Aware™ *Deep Discovery*™; CoManage Corporation; As of Dec. 5, 2000 (2 pages).

ISM Customer—Aware™ *Service Profiling*; CoManage Corporation; As of Dec. 5, 2000 (2 pages).

ISM Customer—Aware™ *Fault and Performance Management*; CoManage Corporation; As of Dec. 5, 2000 (2 pages).

Lonvick, C. The BSD syslog Protocol. RFC 3164 [online], Aug. 2001 [retrieved on 2002-03-25]. Retrieved from the Internet,<url: HTTP://www.ietf.org/rfc/rfc3164.txt>.

Case, J., A Simple Network Management Protocol (SNMP). RFC 1098 [online], Apr. 1989 [retrieved on 2002-03-26]. Retrieved from the internet<URL: http://www.ietf.org/rfc/rfc1098.txt?number=1098>.

Postel, J.B. Simple Mail Transfer Protocol. RFC 821 [online], Aug. 1982 [retrieved on 2002-03-26]. Retrieved from the Internet<URL: http:///www.ietf.org/rfc/rfc0821.txt?number=821>.

Finseth, C. An Access Control Protocol, Sometimes called TACACS. RFC 1492 [online], Jul. 1993 [retrieved on 2002-03-25]. Retrieved from the Internet <URL: http://www.cis.ohio-state.edu/cgi-bin/rfc/rfc1492.html>.

Anderson, B.A. TACACS User Identification Telnet Option. RFC 927 [online], Dec. 1984 [retrieved on 2002-03-25]. Retrieved from the Internet<URL: http://www.ietf.org/rfc/rfc0927.txt>.

Rigney, C., et al. Remote Authentication Dial In User Service (RADIUS). RFC 2138 [online], Apr. 1997 [retrieved on 2002-03-25]. Retrieved from the Internet <URL: http://www.ietf.org/rfc/rfc2138.txt>.

Rigney, C., Radius Accounting. RFC 2139 [online], Apr. 1997 [retrieved on 2002-03-25]. Retrieved from the Internet <URL: http://www.ietf.org/rfc/rfc2139.txt>.

Postel, J., and Reynolds, J. Telnet Protocol Specification. RFC 854 [online], May 1983 [retrieved on 2002-03-25]. Retrieved from the Internet<URL: http://www.ietf.org/rfc/rfc0854.txt>.

Gold Wire Technology, "Tracking Changes." In *Formulator 1.0 User Guide*, pp. 211-224.

Lewis, L., *"Policy-Based Configuration Management: A Perspective from a Network Management Vendor,"* http://www.simple-times.org./pub/simple-times/issues/8-1.html., pp. 7-27.

Waldbusser, ST., et al., "Policy Based Management MIB," http://www.ietf.org/internet-drafts/draft-ietf-snmpconf-pm-05.txt. pp. 1-1102.

Strassner, J., *A New Paradigm for Network Management: Business Deriven Device Management*, [online], 2002, http://www.ssgrr.it/en/ssgrr2002s/papers.htm,http://www.ssgrr.it/en/ssgrr2002s/papers/162.pdf.

* cited by examiner

*FIGURE 4.*

| 210 | | | | | | |
|---|---|---|---|---|---|---|
| Ciena | x.0 | x.1 | x.2 | x.3 | x.4 | |
| Multiwave 4000 | x.0 | x.1 | x.2 | x.3 | x.4 | |
| Juniper | x.0 | x.1 | x.2 | x.3 | x.4 | |
| M20 | | | | | | |
| CISCO | 12.0 | 12.2 | x.0 | x.1 | x.2 | |
| 7500 | Schema A | Schema B | | | | |
| 6509 | | | | | | |
| xxxx | | | | | | |
| xxxy | | | | | | |

225, 220, 215

SYSTEM AND METHOD FOR GENERATING A REPRESENTATION OF A CONFIGURATION SCHEMA

FIELD OF THE INVENTION

The present application is related to commonly owned and assigned application Nos.:
- Ser. No. 09/730,864, entitled System and Method for Configuration, Management and Monitoring of Network Resources, filed Dec. 6, 2000;
- Ser. No. 09/730,680, entitled System and Method for Redirecting Data Generated by Network Devices, filed Dec. 6, 2000;
- Ser. No. 09/730,863, entitled Event Manger for Network Operating System, filed Dec. 6, 2000;
- Ser. No. 09/730,671, entitled Dynamic Configuration of Network Devices to Enable Data Transfers, filed Dec. 6, 2000;
- Ser. No. 09/730,682, entitled Network Operating System Data Directory, filed Dec. 6, 2000;
- Ser. No. 09/799,579, entitled Global GUI interface for Network OS, filed Mar. 6, 2001;
- Ser. No. 09/942,834, entitled System and Method for Generating a Configuration Schema, filed Aug. 29, 2001; and
- Ser. No. 09/942,833, entitled System and Method for Modeling a Network Device's Configuration, filed Aug. 29, 2001.

all of which are incorporated herein by reference.

The present invention relates to network device interrogation and configuration. In particular, but not by way of limitation, the present invention relates to systems and methods for interrogating and configuring routers, switches, hubs, and/or optical components.

BACKGROUND OF THE INVENTION

Networks, and in particular, the Internet, have revolutionized communications. Data vital to the continued prosperity of the world economy is constantly being exchanged between end-users over these networks. Unfortunately, the expansion and maintenance of these networks is outpaced by the demand for additional bandwidth. Network equipment is often difficult to configure, and qualified network technicians are in extremely short supply. Thus, many needed network expansions and upgrades must be delayed until these technicians are available. While these upgrades and expansions are pending, end-users continue to suffer poor network performance.

For example, Cisco™ routers are notoriously difficult to configure—especially in light of the new XML-based interfaces introduced by competitors such as Juniper Networks™. Instead of a user-friendly XML-based interface, Cisco uses a cumbersome command line interface (CLI) for its routers. Cisco's CLI interface is the result of many years of semi-controlled modifications to its router operating systems and has resulted in a tangled mess of commands and subcommands.

If Cisco attempted to abandon its CLI in favor of the new user-friendly XML-based interface, many years of development and expertise could be lost. Moreover, even if it could develop an XML-based interface, there is presently no economical way to integrate it into the thousands of existing routers. Despite the difficulties in implementing a more user-friendly interface, to remain competitive, Cisco and similarly situated companies need to move away from the CLI. However, present technology does not provide these companies with an acceptable option that allows continued use of its extensive CLI knowledge base while simultaneously providing system administrators with a user-friendly interface, e.g., XML-based interface. Moreover, present technologies do not provide an acceptable way to provide backward compatibility with existing devices.

Cisco is not the only manufacturer to face this interface-upgrade problem. Many manufacturers would like to continue using their existing interface knowledge base while providing system administrators a friendly, consistent interface. Accordingly, a system and method are needed that will allow manufacturers, like Cisco, to create user-friendly interfaces for both next-generation and existing devices.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the present invention can provide a system and method for generating a configuration schema and/or a representation thereof for network devices. Other embodiments can provide a system and method for configuring network devices using a configuration schema and/or a representation of the schema. These and other embodiments are discussed more fully below.

Although schema are generally used to validate commands, in one implementation of the present invention, the configuration schema can be used to generate commands. For example, a configuration command can be retrieved from a Cisco router. This configuration command is generally expressed in terms of a CLI-based command structure. Using the XML configuration schema, however, the CLI-based commands can be converted to an XML format, which is significantly more manageable than a CLI-based format. Once the CLI-based command has been converted to an XML format, the XML version of the command can be easily passed between various computers and system administrators in a highly readable, standardized format.

In another implementation, the schema can be used to generate CLI commands from, for example, XML-based commands. As previously described, the configuration schema contains the commands, command hierarchy and bounds of the various configuration commands. When given a command in XML format, the command information in the configuration schema can be used to reformat the XML-based command into a proper CLI format. Once reformatted into a CLI format, the command can be pushed out to the appropriate router. Thus, a system administrator could configure such a router without knowing the specifics of the CLI.

In another embodiment of the present invention, a representation of the schema is substituted for the schema or used in conjunction with the schema. This representation can be used anywhere that the schema can be used, but can provide significant "runtime" advantages versus the original schema. For example, the representation of the schema can be used to validate commands, generate commands, drive a graphical user interface, etc.

The representation of the schema can be generated by traversing the schema and creating, for example, a hash table or hash map with entries linked to corresponding container objects. These container objects can include information from the schema and other data, e.g., metadata, which may not be included in the schema, such as device manufacturer, device type, device model, device operating system, etc.

Advantages of the representation of the schema can include a smaller memory footprint than the complete schema, decreased traversal time when generating or converting commands, and ease-of-use relative to the original schema. As previously stated, however, the above-described embodiments, implementations, and advantages are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 4 is a representation of one storage model for storing configuration schema across different device types, manufacturers, models and operating system versions;

DETAILED DESCRIPTION

Figure 1:
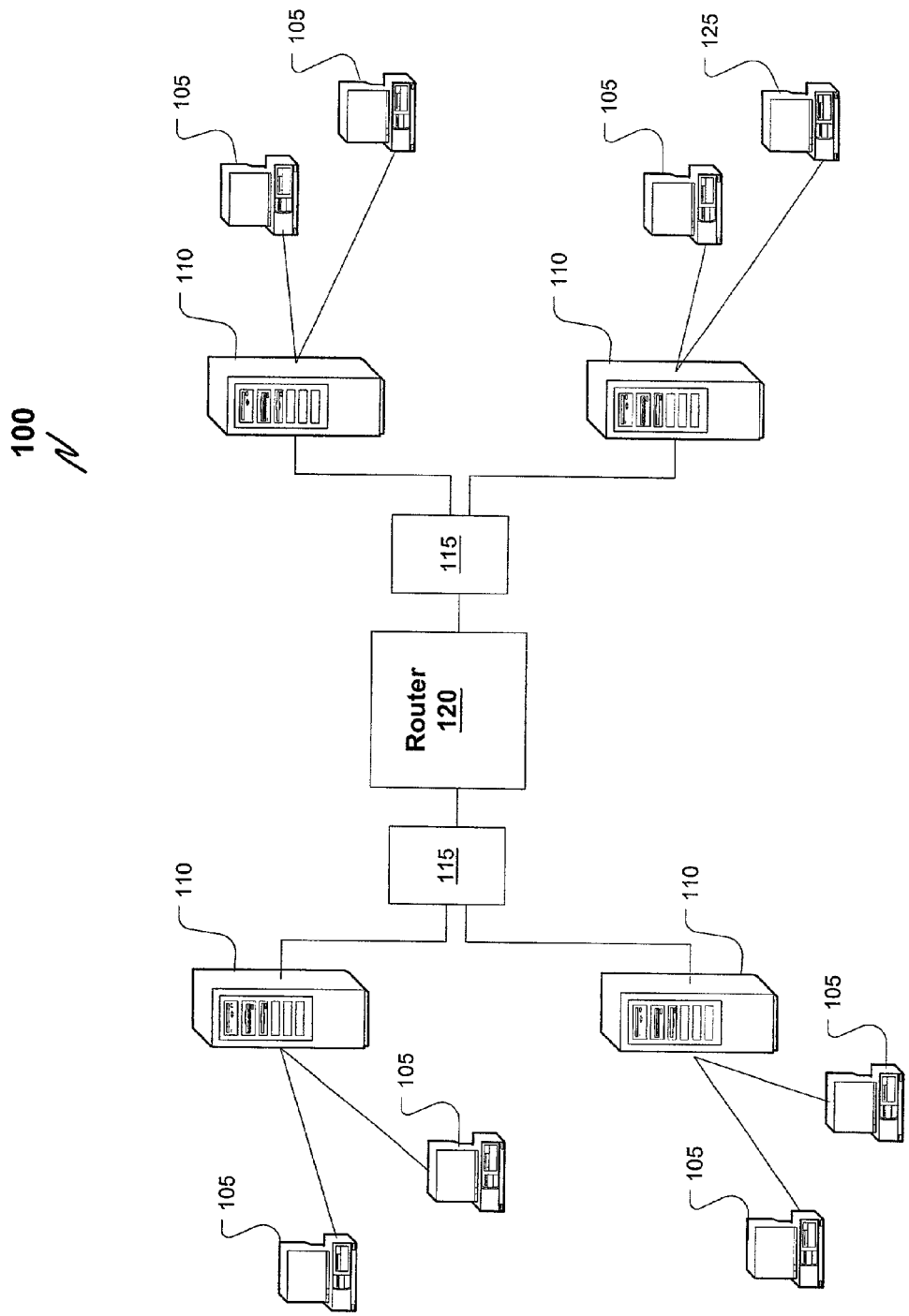
FIG. 1 is a block diagram of a conventional network.

Referring now to the drawings, where like or similar elements are designated with identical reference numerals throughout the several views, and referring in particular to FIG. 1, it illustrates a block diagram of a conventional network system 100. In this network system 100, end-users 105 are connected to servers 110, which are connected to networking equipment such as hubs, (not shown) optical components 115, and routers 120. Using the networking equipment, end-users 105 associated with different servers 110 can exchange data.

As new servers 110 and end-users 105 are added to the overall system 100, or as new software becomes available, the routers 120 and/or optical components 115 of the network system 100 may need reconfiguring. To reconfigure these components, a system administrator 125—with the proper authorization—could access the router 120 and/or optical component 115 by, for example, establishing a telnet connection to the component and transferring configuration instructions thereto.

Figure 2:
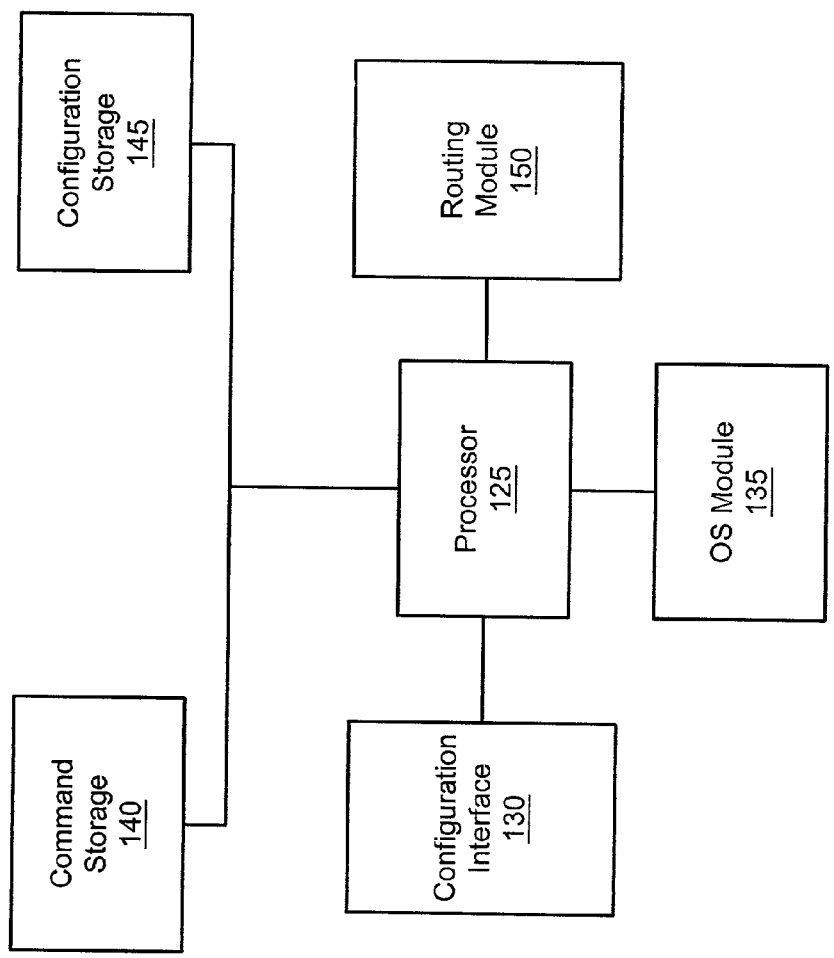
FIG. 2 is a block diagram of a conventional router.

Referring now to FIG. 2, it is a block diagram of a conventional router. In this representation, a processor 125 is connected to a configuration interface 130, an operating system (OS) storage module 135, a command storage module 140, a configuration storage module 145, and a routing module 150. The illustrated arrangement of these components is logical and not meant to be an actual hardware diagram. Thus, the components can be combined or further separated in an actual implementation. Moreover, the construction of each individual component is well-known to those of skill in the art.

When a system administrator 125 wishes to reconfigure a router 120, he accesses the router 120 through the configuration interface 130 and retrieves the present configuration for the router 120 from the configuration storage module 145. The system administrator 125 can review available configuration commands and bounds—usually in a CLI format—by accessing and reviewing the commands stored in the command storage module 140. In essence, the command storage module 140 provides the knowledge base for a "help" screen. The commands stored in the command storage module 140 are generally unique to the particular OS version stored in the OS module 135.

After the system administrator 125 has constructed the new configuration instructions, these instructions are pushed through the configuration interface 130 and stored in the configuration storage module 145. For Cisco routers, interaction is generally through a CLI. In other words, the command storage module 140 is queried through the CLI; available commands are returned through the CLI; and new configuration commands are provided to the router 120 through the CLI. Unfortunately, the CLI is difficult to manage and requires highly skilled technicians for even simple tasks.

Figure 3:
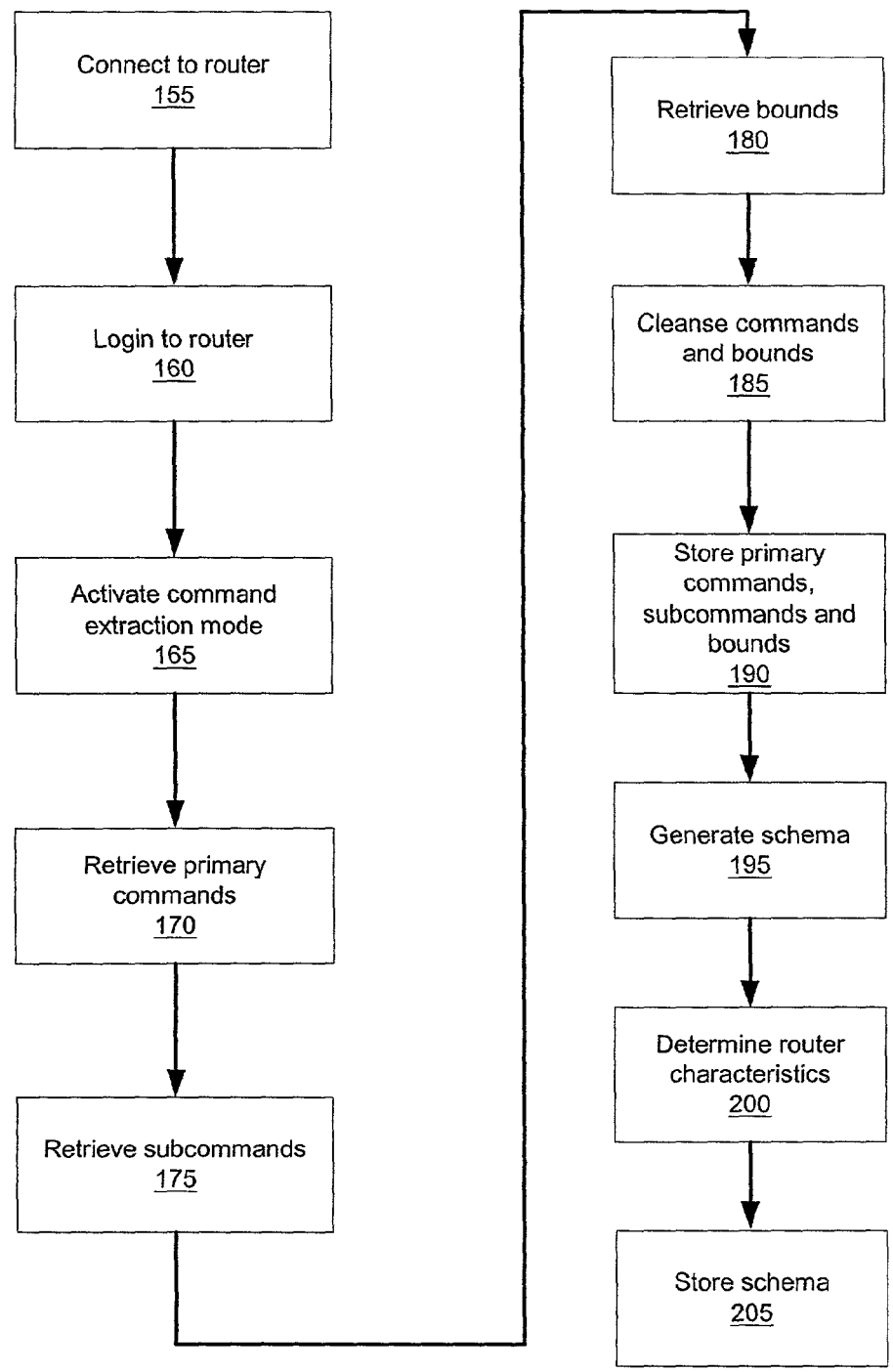
FIG. 3 is a flowchart of a method for generating a configuration schema in accordance with one embodiment of the present invention.

Referring now to FIG. 3, it is a flowchart of one method for generating a configuration schema in accordance with the principles of the present invention. The illustrated method can be used, for example, to generate an XML schema from the CLI commands associated with a Cisco router. In accordance with the principles of the present invention, one method for constructing a configuration schema involves a system administrator 125 (in conjunction with an automated system) connecting to a router 120 through, for example, a telnet connection. Next, the system administrator 125 logs into the router 120 and activates a command extraction mode (steps 160 and 165). With regard to a Cisco router, the command extraction mode is activated by entering a "?"at the prompt. Next, the system administrator 125 retrieves the primary commands, subcommands and bounds (steps 170, 175 and 180). This retrieval can be done through an automated, recursive search. For a Cisco router, the following search could be executed and the following results returned where ">"is the CLI prompt:

>?
router
admin
global
>router?
bgp
ospf
>

This process could be repeated until termination for each command and subcommand.

Once the commands, subcommands, and bounds are collected, they can then be recorded and cleansed (steps 185 and 190). Duplicate commands, for example, could be identified. When these duplicate commands include different subcommands and/or bounds, a single, cleansed command can be constructed to replace the duplicate commands. The cleansed commands, assuming that cleansing was necessary, can then be used to build a configuration schema, which in essence is a modeling of the router's command structure (step 195). An example snippet of such a modeling in an XML schema is represented by:

```
<xsd:element name="vlan">
    <xsd:complexType>
        <xsd:choice>
            <xsd:sequence>
                <xsd:element name="mapping">
                    <xsd:complexType/>
                </xsd:element>
                <xsd:element name="dot1q" fixed="dot1q">
                    <xsd:complexType/>
                <xsd:element>
                <xsd:element name="ARG.001".
                    <xsd:simpleType>
                    .
                    .
                    .
        </xsd:choice>
    </xsd:complexType>
</xsd:element>
```

In one embodiment, the conversion between the text file and the XML configuration schema is performed by a Visual Basic program. This program identifies arrays of related commands in the text file. Individual arrays can be identified, for example, because they are generally separated by termination characters or by logical termination indicators. Additionally, when an input indicator is encountered in the text file, the program can insert a placeholder into the configuration schema to represent the input indicator. This placeholder can then be associated with the bounds for that particular input. For example, if the input corresponding to the input indicator should be between 1 and 10, a bound of 1 to 10 can be associated with the placeholder.

After the configuration schema has been generated, it is associated with characteristics of the router and stored accordingly (steps 200 and 205). For example, the configuration schema might be associated with a Cisco router, model 7500, OS version 12.0. A representation of a storage model 210 for storing configuration schema according to manufacturer, device type, device model, and OS version is shown in FIG. 4. The first data block 215 is dedicated to Cisco routers as indicated in the upper left-hand corner. Each row represents a different model of Cisco device, and each column represents a different OS version. Similarly, the second data block is for Juniper™ routers 220 and the third is for Ciena™ devices 225.

Figure 5:
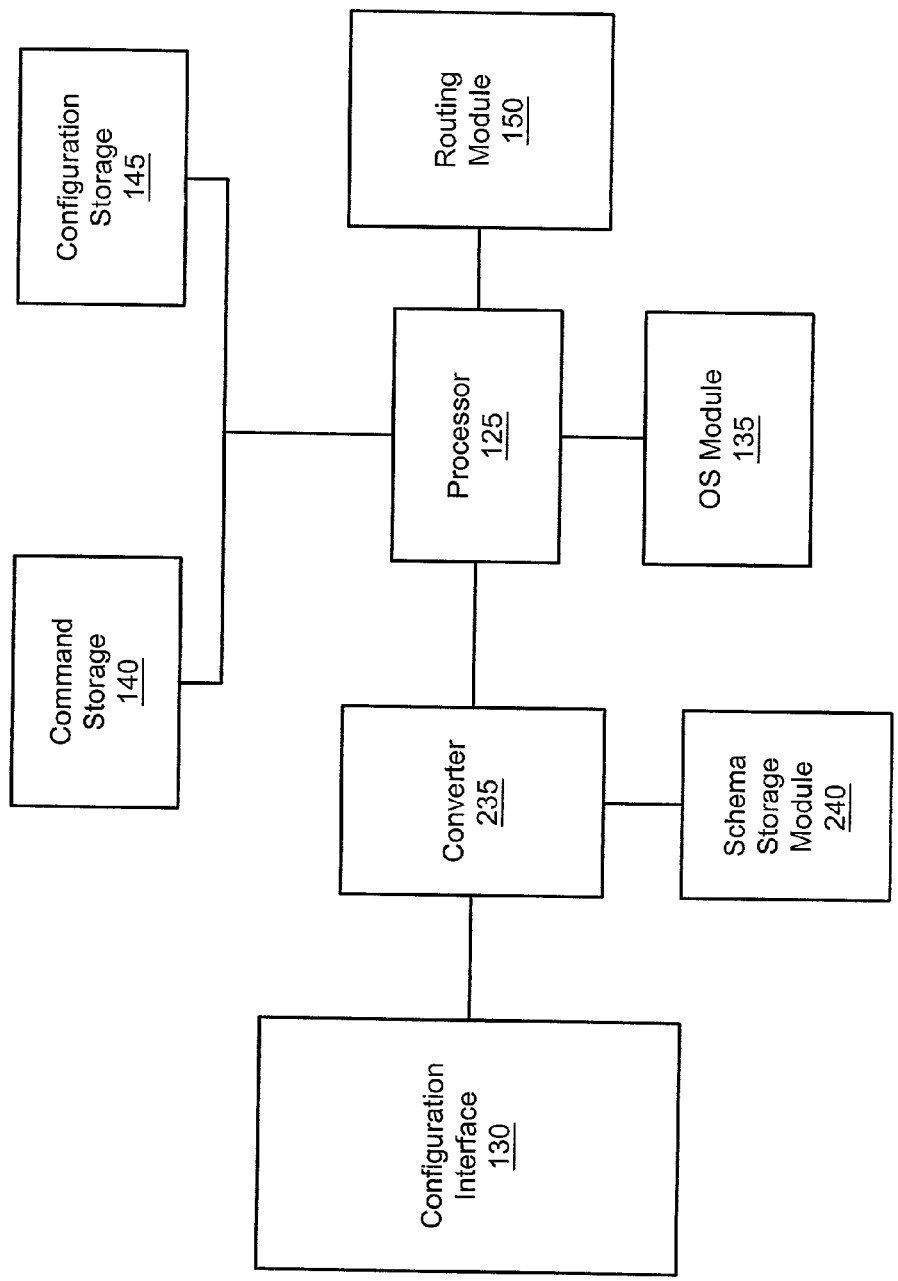
FIG. 5 is a block diagram of a router constructed in accordance with one embodiment of the present invention.

Referring now to FIG. 5, it is a block diagram of a router 230 constructed in accordance with one embodiment of the present invention. In this embodiment, a converter 235 and schema storage module 240 are added to the router of FIG. 2. The router 230 is generally configured to interface with the system administrator 125 through the configuration interface. Even though the router 230 operates through a CLI configuration interface, a system administrator 125 can reconfigure such a router using XML-based commands— assuming the configuration schema stored in the schema storage module 240 is an XML schema. For example, a system administrator 125 can send an XML-based command to the configuration interface 130. That XML-based command can be passed to the converter 235 which converts the XML-based command to a CLI-based command using the XML schema. A CLI-based command, not the XML command, can then be passed to the configuration storage module 145 where it is integrated into the configuration of the router.

Figure 6:
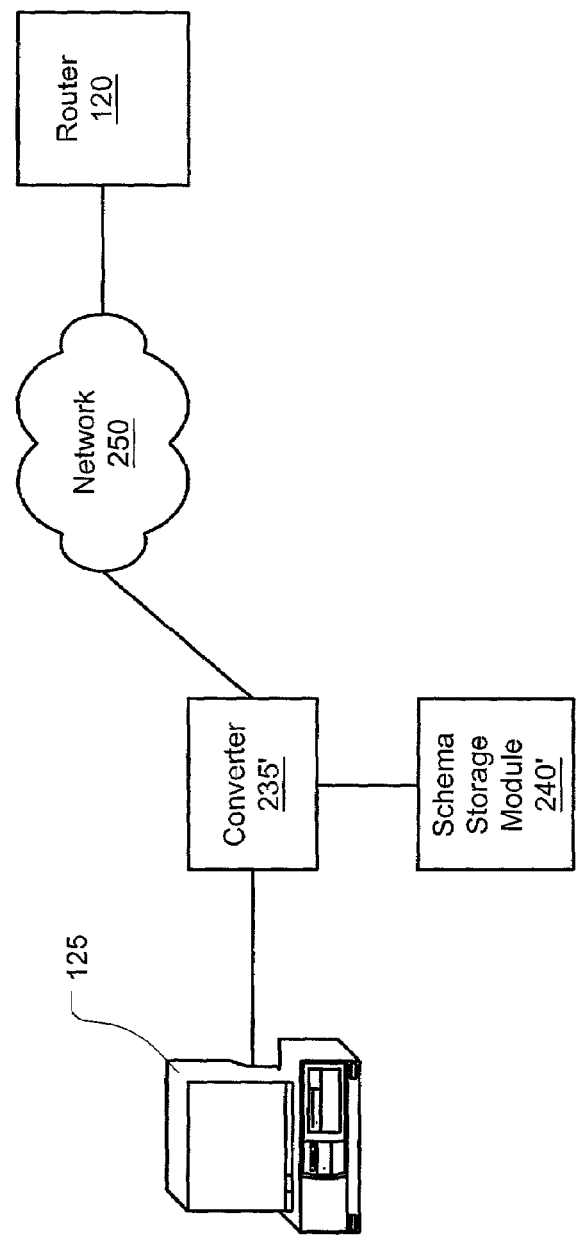
FIG. 6 is a block diagram of one embodiment of the present invention.

Referring now to FIG. 6, it is a block diagram 245 of an embodiment of the present invention in which the converter and schema storage 245 are localized within the system administrator 125. Rather than components within the router 120 converting an XML-based command to a CLI-based command, the localized converter 235' and schema storage module 240' convert the XML-based command to a CLI-based command and then transmit the CLI-based command through the network 250 to the router 120.

Figure 7:
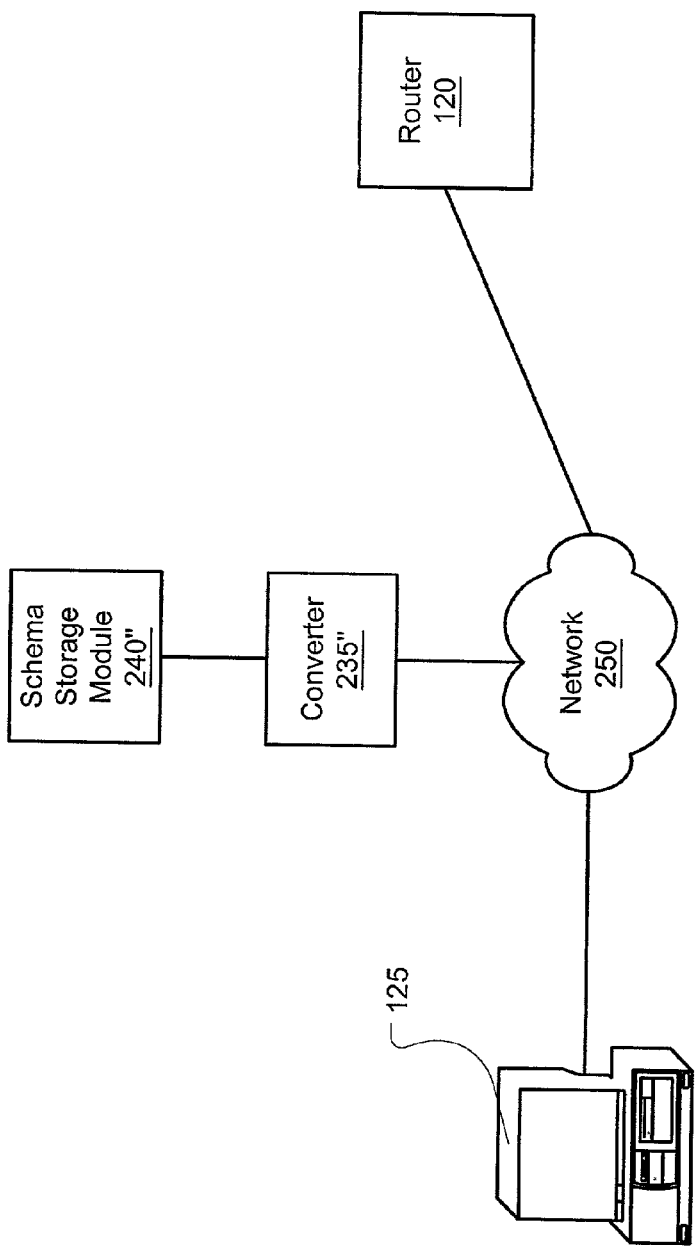
FIG. 7 is a block diagram of another embodiment of the present invention.

Referring now to FIG. 7, it shows a block diagram 255 of yet another embodiment of the present invention. In this embodiment, the converter 235" and schema storage module 240" are distributed relative to both the router 120 and the system administrator 125. Thus, any XML-based configuration commands generated by the system administrator 125 are sent through the network 250 to the converter 235." Using the configuration schema stored in the schema storage module 240", the converter 235" can convert the XML-based command to a CLI-based command and send that command through the network 250 to the router 120.

Figure 8:
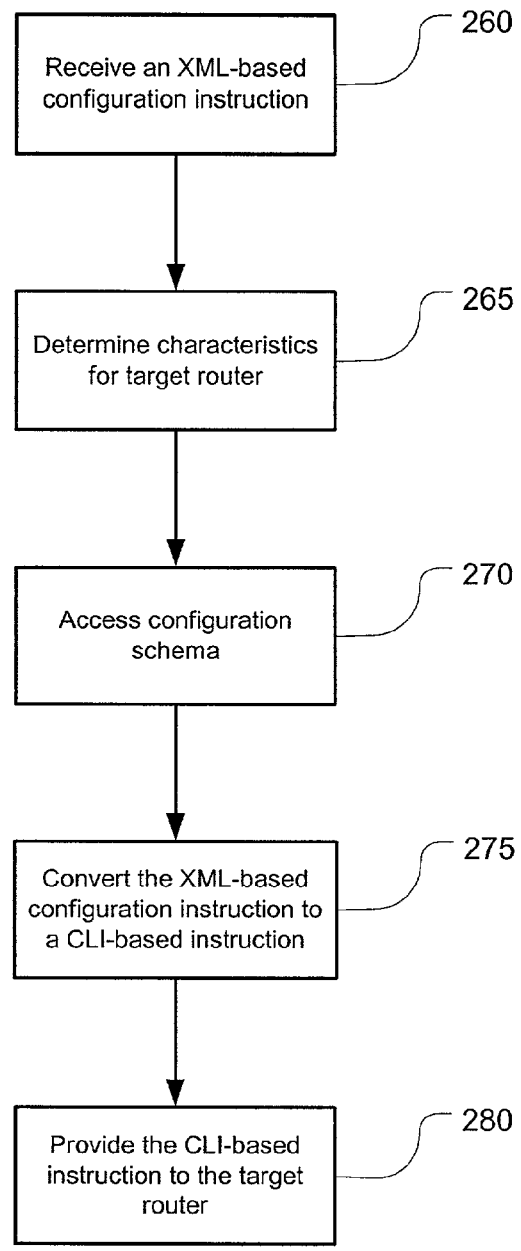
FIG. 8 is a flowchart of one method for configuring a router using a configuration schema.

FIG. 8 illustrates one method of operating the system of FIG. 7. In this method, the converter 235" initially receives an XML-based configuration command (step 260). The converter 235" then determines the manufacturer, model and/or OS version for the router 120 to which the command is directed and accesses the appropriate configuration schema for that router 120. The (steps 265 and 270) converter 235" then generates a CLI-based command from the XML-based command, verifies the correctness and validity of that command, and provides it to the router 120 (steps 275 and 280).

Figure 9:
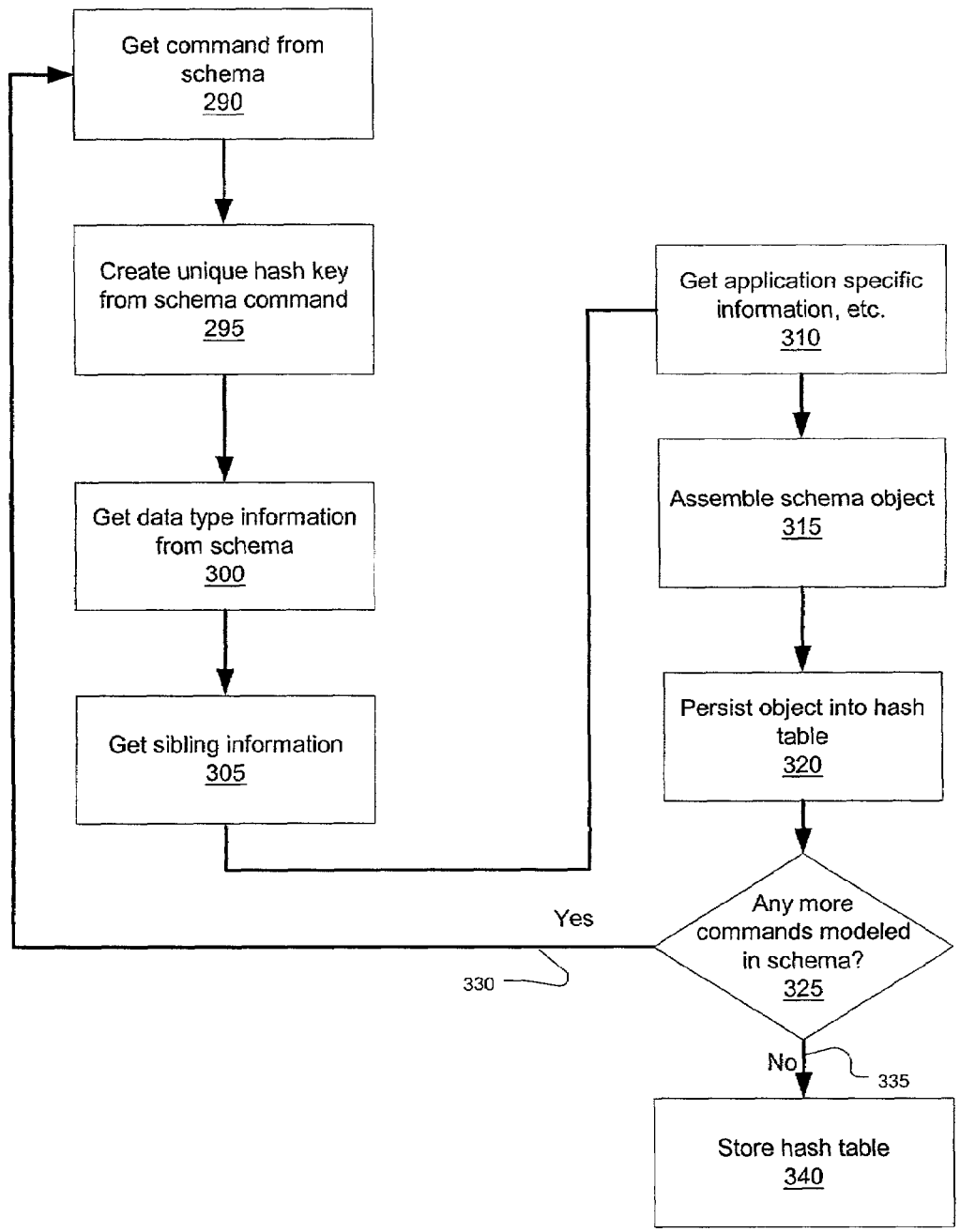
FIG. 9 is a flowchart of one method for generating a representation of a configuration schema.

Referring now to FIG. 9, it is a flowchart of one method for generating a representation of a configuration schema. In this embodiment, a representation is generated for each schema. For example, if a first schema was associated with a particular class of Cisco routers and a second schema was associated with a particular class of Juniper routers, then each schema could have a corresponding, unique representation.

To generate a representation of a particular configuration schema, one embodiment of the present invention retrieves a command from the previously assembled configuration schema (step 290). Additionally, any related commands, e.g., parent commands, child commands, sibling commands, root commands, etc., in the configuration schema can be identified and retrieved. The retrieved command and the retrieved parent commands can then be used to generate a unique hash key for the retrieved command (step 295). An example of such a hash key is:

configuration|interface|FastEthernet.

This type of key can be generated by concatenating indicators of different commands. For example, a hash key can be created by concatenating a parent command, such as "configuration," with a sibling command, such as "interface."

After the unique hash key is generated, a corresponding hash object can also be generated. This hash object can include basic information related to the generated hash key. To generate the schema hash object, information such as data type, sibling commands, and application specific information can be retrieved and assembled into the schema object (steps 300, 305, 310 and 315). The data type information, for example, can indicate whether the data associated with a particular command is a string, an integer, etc. and the sibling information can identify commands at the same hierarchical level as the initially retrieved command that have the same parent command as the initially retrieved command. Additionally, in certain embodiments, specialized application information can also be retrieved from the schema or another source. This application information, for example, can define special processing requirements for a schema. Certain embodiments of the schema hash object also include metadata such as device name, device type, device manufacturer, operating version, etc.

An exemplary hash object is shown in Example 1. The hash object in Example 1 is associated with the key "configuration|interface|FastEthernet."

EXAMPLE 1

Hash Object name=FastEthernet
parent=interface
hierarchy=configuraiton|interface
type=null
container=choice
isContianterOptional=false
containerlist=[choice]
childContainer=complextype
isBounded=false
isOptional=false
isBoolean=false
childElements=[ARG.001, no, arp, random-detect, bandwidth, cdp, description, ip, encapsulaiton, fair-queue, hold-queue, keepalive, logging, priority-group, standby, shutdown]
siblingElements=[ ]
documentation—Fast Ethernet Interface
appInfo=[VALUE_CONCATENATED]
isUseRestOfLine=false
isValueConcatenated=true
restriction base=null
minLength=null
minInclusive=null
maxInclusive=null This use of key-based objects has several significant advantages. First, because each schema node of interest is represented in the hash by a key and an associated object, getting to an object via the key is very quick compared to having to traverse through the original schema. Since a direct lookup is possible with the key approach, this significantly reduces the runtime processing required to get schema node information. Second, the object generally contains only the information of interest about the schema node. Thus, extraneous node layers and node data do not have to be decoded and then ignored during the runtime processing. This also reduces processing time. Third, the fact that the schema nodes are manifested as generic programming objects provides ease-of-use for "consumers" of the schema. These consumers, which are other processes, do not have to have built-in redundant knowledge of how to properly traverse and decode the schema objects. This also makes debugging and maintenance much easier since this more difficult code only exists in one place. Fourth, a schema node object can be retrieved from the hash and passed to other programs without having to pass the entire schema or a disjointed part thereof.

Hash objects can be divided into groups of hash objects, referred to as hashlets. Hashlets can be organized in a variety of ways. For example, hashlets can be formed by grouping hash objects related to a certain level of configuration commands, such as all sibling commands to the "interface" command. In other embodiments, hashlets can be formed by grouping hash objects related to certain tasks. For example, a hashlet can be formed of hash objects related to Quality of Service (QOS) commands.

Once a hash object has been assembled, the unique key can be stored in a hash map in association with the hash object. If there are any more commands in the schema that need to be modeled (decision 325), branch 330 is followed and the next command can be retrieved (step 290). If all of the commands have been modeled, then branch 335 can be followed and the various hash objects can be stored as a completed hash table (step 340).

Figure 10:
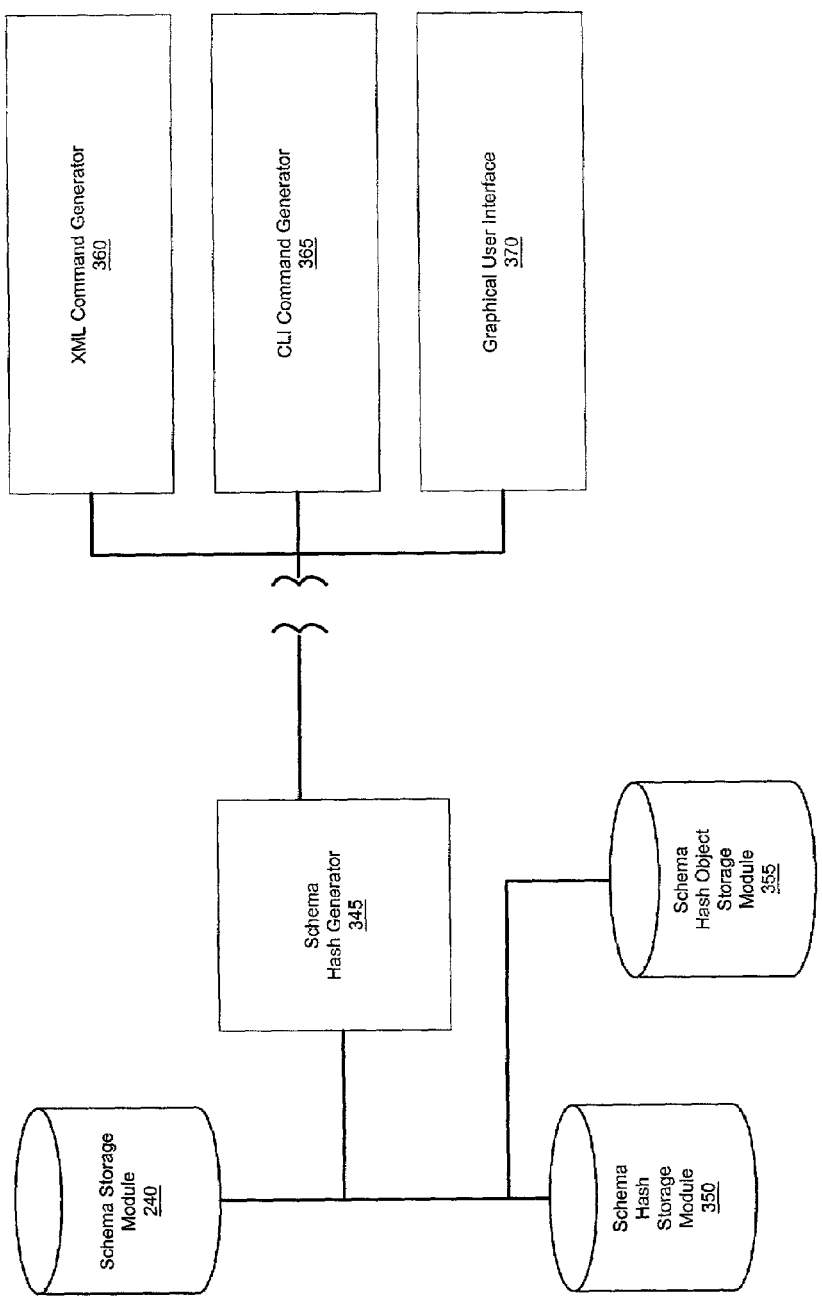
FIG. 10 is a block diagram of one embodiment of the present invention incorporating a representation of the configuration schema.

Referring now to FIG. 10, it is a block diagram of one embodiment of the present invention incorporating a representation of the configuration schema. In this embodiment, a schema hash generator 345, which is one implementation of a system for generating a representation, is connected with a schema storage module 240, a schema hash key storage module 350, and a schema hash object storage 355. The schema hash storage module 350 and the schema hash object storage module 355 can be a single memory device or multiple memory devices.

Data from the schema hash key storage module 350 and/or the schema hash object storage module 355 can be used in various network management applications. For example, the hash keys and the hash objects can be used by a device-neutral command generator, such as an XML command generator 360, to generate device-neutral commands from device-native commands. In other embodiments, the hash keys and the hash objects can be used by a device-native command generator, such as a CLI command generator 365, to generate device-native commands from device-neutral commands. In yet another embodiment, the hash keys and the hash objects can be used by a graphical user interface (GUI) to provide a system administrator with a simplified, device-neutral interface for managing a series of network devices.

Referring now to FIG. 11, it is a block diagram of one implementation of a representation of the configuration schema. In this implementation, a schema hash key storage module 350 and a schema hash object storage module 355 are connected to a configuration manager 360. The configuration manager 360 can use data from the hash key storage module 250 and the schema hash object storage module 355 to interface with the network device 365.

Although the embodiments of the present invention are generally described with regard to a router and in particular with regard to Cisco routers, one skilled in the art can understand that the embodiments of the present invention can incorporate routers from most router manufacturers and many other types of network components such as hubs, switches, and optical components. Thus, those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for modeling a command structure of a particular network component, the method comprising:
   accessing the particular a network component, wherein the particular network component is capable of facilitating communications in a network, wherein the network includes a plurality of network components;

retrieving a command set from the network component, the command set includes commands for configuring the particular network component, and wherein the commands for configuring the particular network components differ from other commands utilized for configuring other network components;

generating a representation of the retrieved command set, wherein the generated representation corresponds to the network component, and wherein the generating the representation includes:

generating a hash key corresponding to at least a portion of the retrieved command set; and generating a hash object corresponding to the generated hash key, wherein the generated hash object includes metadata, the metadata including information that identifies the network component from among a plurality of network components; and storing the generated representation, wherein the step of generating a hash key comprises:

identifying a first level configuration command in the retrieved command set;

identifying a second level configuration command in the retrieved command set; and concatenating at least an indication of the first level command and at least an indication of the second level command.

2. The method of claim 1, further comprising:
generating a configuration schema from the retrieved command set;
wherein the representation is generated from the configuration schema.

3. The method of claim 2, wherein the generated hash object includes data from the configuration schema.

4. The method of claim 1, wherein retrieving the command set comprises:
retrieving a set of primary commands;
retrieving a set of subcommands for each of the primary commands in the set of primary commands; and
retrieving a set of bounds for a plurality of the set of subcommands for a first of the primary commands.

5. The method of claim 4, wherein generating the hash key comprises:
combining at least an indication of the first of the primary commands with at least an indication of the first of the set of subcommands corresponding to the first of the primary commands.

6. A system for modeling command structures of network components comprising:
a configuration hash key storage module;
a configuration hash object storage module in communication with the configuration hash key storage module;
a configuration hash generator in communication with the configuration hash object storage module, wherein the configuration hash generator is configured to generate hash objects, which include metadata that identifies the network component from among a plurality of network components;
a configuration schema storage module in communication with the configuration hash generator; and
a configuration manager in communication with the configuration hash object storage module,
wherein the configuration manager includes:
a device-neutral configuration command generator,
a device-native configuration command generator; and
a hash object-driven graphical user interface.

7. A computer readable medium, which tangibly embodies a sequence of instructions executable by a machine, comprising:
a plurality of configuration command hash keys, each of the plurality of configuration command hash keys corresponding to at least one of a plurality of configuration commands;
a plurality of configuration command hash objects, wherein each of the plurality of configuration command hash objects corresponds to at least one of the plurality of configuration command hash keys;
wherein each of the plurality of configuration command hash objects comprises both schema data corresponding to at least one of the plurality of configuration commands and metadata that identifies a network component from among a plurality of network components,
wherein the configuration command hash objects are accessible by a configuration manager, wherein the configuration manager includes:
a device-neutral configuration command generator;
a device-native configuration command generator; and
a hash object-driven graphical user interface.

8. An apparatus for modeling a command structure of a particular network component comprising:
means for accessing the particular network component, wherein the particular network component is capable of facilitating communications in a network, wherein the network includes a plurality of network components;
means for retrieving a command set from the network component, the command set includes commands for configuring the particular network component, and wherein the commands for configuring the particular network components differ from other commands utilized for configuring other network components;
means for generating a representation of the retrieved command set, wherein the generated representation corresponds to the network component, and wherein the means for generating the representation includes:
means for generating a representation of the retrieved command set, wherein the generated representation corresponds to the network component, and wherein the means for generating the representation includes:
means for generating a hash key corresponding to at least a portion of the retrieved command set; and
means for generating a hash object corresponding to the generated hash key, wherein the generated hash object includes metadata, the metadata including information that identifies the network component from among a plurality of network components; and
means for storing the generated representation,
wherein the means for generating a hash key comprises:
means for identifying a first level configuration command in the retrieved command set;
means for identifying a second level configuration command in the retrieved command set; and
means for concatenating at least an indication of the first level command and at least an indication of the second level command.

9. The apparatus of claim 8, further comprising:
means for generating a configuration schema from the retrieved command set;
wherein the representation is generated from the configuration schema.

10. The apparatus of claim 9, wherein the generated hash object includes data from the configuration schema.

11. The apparatus of claim 8, wherein the means for retrieving the command set comprises:
    means for retrieving a set of primary commands;
    means for retrieving a set of subcommands for each of the primary commands in the set of primary commands; and
    means for retrieving a set of bounds for a plurality of the set of subcommands for a first of the primary commands.

12. The apparatus of claim 11, wherein the means for generating the hash key comprises:
    means for combining at least an indication of the first of the primary commands with at least an indication of the first of the set of sub commands corresponding to the first of the primary commands.

* * * * *